United States Patent [19]
Ernst et al.

[11] Patent Number: 6,048,906
[45] Date of Patent: Apr. 11, 2000

[54] PREPARATION OF FINELY-DIVIDED, HOMODISPERSE SUSPENSIONS

[75] Inventors: Jürgen Ernst, Erlangen; Uwe Schönebaum; Hans Hofmann, both of Odenthal; Theodor König, Laufenburg, all of Germany

[73] Assignee: AGFA Gevaert N.V., Germany

[21] Appl. No.: 09/003,044

[22] Filed: Jan. 5, 1998

[30] Foreign Application Priority Data

Jan. 10, 1997 [DE] Germany .................. 197 00 532

[51] Int. Cl.[7] ..................................... B01J 13/00
[52] U.S. Cl. ............ 516/77; 366/167.1; 366/173.1; 366/178.1; 422/194; 422/236; 430/569; 516/78
[58] Field of Search ............... 516/77, 927, 78; 422/194, 236; 430/569; 366/167.1, 173.1, 178.1

[56] References Cited

U.S. PATENT DOCUMENTS

| | | | |
|---|---|---|---|
| 3,218,169 | 11/1965 | Kelly, Jr. et al. | 430/569 |
| 3,705,034 | 12/1972 | McNamara | 430/569 |
| 3,728,280 | 4/1973 | Sauer et al. | 516/77 X |
| 3,773,516 | 11/1973 | Gutoff | 430/569 X |
| 3,818,938 | 6/1974 | Carson | 366/167.1 |
| 3,821,002 | 6/1974 | Culhane et al. | 430/569 X |
| 5,104,786 | 4/1992 | Chronis et al. | 430/569 |
| 5,484,697 | 1/1996 | Mignot et al. | 430/569 |
| 5,709,990 | 1/1998 | Jezequel et al. | 430/569 |

FOREIGN PATENT DOCUMENTS 406186656  7/1994  Japan ..................... 430/569

*Primary Examiner*—Richard D. Lovering
*Attorney, Agent, or Firm*—Connolly Bove Lodge & Hutz

[57] ABSTRACT

The preparation of finely-divided, homodisperse dispersions from a liquid medium having sparingly soluble particles contained therein, the particles being produced in a tubular reactor by the reaction of reactants dissolved in the medium, is carried out by introducing the solutions of the reactants, at least at the reaction temperature, into the tubular reactor separately from one another, as coaxial, laminar, parallel flows, and by shielding them from the reactor wall.

8 Claims, 1 Drawing Sheet

PREPARATION OF FINELY-DIVIDED, HOMODISPERSE SUSPENSIONS

The present invention relates to a process and to a device for the preparation of finely-divided, homodisperse dispersions from a liquid medium having sparingly soluble particles contained therein, the particles being produced in a tubular reactor by the reaction of reactants dissolved in the medium.

Suitable dispersions are emulsions and suspensions.

It is frequently desirable to carry out precipitation reactions in a liquid medium by reacting the reactants separately dissolved in the medium in such a way that the suspension produced is a) particularly finely-divided and b) has a particularly narrow particle-size distribution.

A typical example is the preparation of a silver halide emulsion (which in reality is a suspension, but for historical reasons is described as an emulsion) by reacting an aqueous silver nitrate solution with an aqueous alkali metal halide solution or ammonium halide solution in an aqueous gelatine solution. This preparation generally comprises a precipitation of nuclei and a growth phase and in many cases there is the desire to conduct in particular the precipitation of nuclei in such a way that the silver halide suspension is particularly finely-divided and has a very narrow particle-size distribution.

In the process according to the invention it is essential to avoid any turbulent flow, in order thus to eliminate back-mixing; the mixing of the reactants then takes place solely by diffusion.

Figure 1:
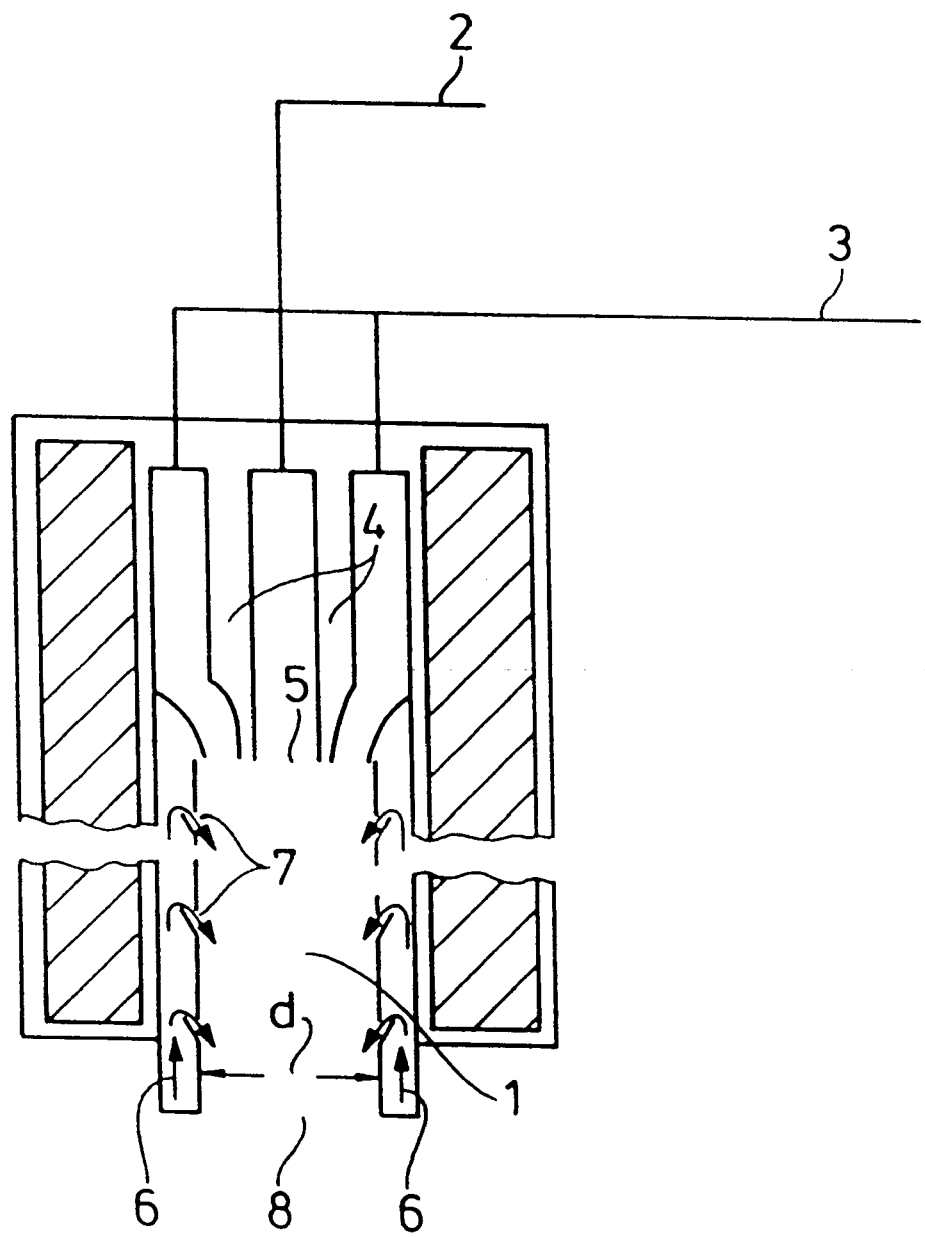
FIG. 1 shows a diagram of a device for carrying out the process according to the invention.

The solution of the reactant A, for example an aqueous silver nitrate solution, is introduced through the supply tube 2 into the tubular reactor 1 having the effective diameter d and the solution of the reactant B, for example an aqueous alkali metal halide solution or an ammonium halide solution, is similarly introduced through the supply tube 3. The reactants A and B may be interchanged.

The solution of the reactant A is introduced into the tubular reactor, for example, through a nozzle plate (not shown), and the solution of the reactant B is introduced into the tubular reactor through an annular gap. Between the nozzle plate and the annular gap, the inlet for a reactant-free liquid medium, for example an aqueous gelatine solution, is provided through the annular gap 4, which keeps the solutions of the reactants separate from one another at the head 5 of the tubular reactor. The arrows 6 indicate an additional inflow of a reactant-free liquid medium, for example an aqueous gelatine solution again, which flows into the tubular reactor through the annular gaps 7, keeps the flows of reactants away from the reactor wall and ensures that an even radial velocity profile is produced.

The product suspension is then discharged at the end 8. The flow rate is controlled by a valve (not shown) attached at the end 8.

The tubular reactor preferably has a round transverse section, but may have a transverse section of another shape, for example, an oval or quadrangular transverse section.

In the Example below, a tubular reactor having an effective length of 1,850 mm (measured from the head 5 to the outlet 8) and an effective diameter d of 98 mm is used. The nozzle plate, through which the reactant A is introduced, has 220 bores providing a total area of 97 mm$^2$. The annular gap through which the reactant B is introduced has a total passage area of 634 mm$^2$. The annular gap 4, through which a reactant-free liquid medium is introduced, has a total passage area of 298 mm$^2$. The tubular reactor has twenty-one annular gaps 7 at intervals of 78 mm from the head 5 and from one another.

The tubular reactor was constructed from materials which are extremely inert under the reaction conditions: special steel, titanium and polyvinylidene fluoride.

EXAMPLE

The reactor was heated to 50° C. and completely filled with 2 wt. % gelatine solution.

The silver nitrate solution used (reactant A) had a concentration of 0.66 mol/l; the potassium bromide solution used (reactant B) was 0.66 molar. The gelatine solution introduced into the reactor head and into the annular gaps of the tubular reactor was a 2 wt. % solution. All the solutions were aqueous and were heated to 50° C.

The volumetric flow rates were 0.75 l/min for the silver nitrate solution, 0.75 l/min for the potassium bromide solution and 4.5 l/min for the gelatine solution. These were charged into the reactor head at 4.17 l/min and evenly at a rate of 0.33 l/min through all the annular gaps 7 of the tubular reactor.

After 14 minutes the reactor had attained the stationary operating state.

A sample of the emulsion obtained was analysed with respect to the particle-size distribution. The volumetrically determined particle diameter was 0.10 μm, the volume variation coefficient (VVC) was 30% and the numerically determined particle diameter was 0.07 μm.

What is claimed is:

1. A process for preparing finely-divided, homodisperse dispersions from a liquid medium having sparingly soluble particles contained therein, the particles being produced in a vertically oriented tubular reactor by a reaction of reactants dissolved in the medium, the process comprising the steps of introducing solutions of the reactants, at least at reaction temperature, into the tubular reactor separately from one another, as coaxial, laminar or parallel flows, and shielding the solutions from the reactor wall, and wherein the solution of a first reactant is introduced through a multiplicity of bores of a concentric nozzle plate, a reactant-free liquid medium is introduced through a first annular gap arranged concentrically around the nozzle plate, the solution of a second reactant is introduced through a second annular gap arranged concentrically around the first, and a reactant-free liquid medium is introduced through a third annular gap arranged concentrically around the second.

2. A process according to claim 1, wherein prior to commencement of the reaction, the tubular reactor is flooded with reactant-free liquid medium.

3. A process according to claim 1, wherein the flow of the solutions of the reactants and of the product suspension through the tubular reactor is laminar.

4. A process according to claim 1, wherein the length of the reactor is such that the precipitation reaction is concluded at the latest at the end of the reactor.

5. A process for preparing finely-divided, homodisperse dispersions from a liquid medium having sparingly soluble particles contained therein, the particles being produced in a tubular reactor by a reaction of reactants dissolved in the medium, the process comprising the steps of introducing solutions of the reactants, at least at reaction temperature, into the tubular reactor separately from one another, as coaxial, laminar or parallel flows, and shielding the solutions from the reactor wall, by the introduction of a reactant-free medium through annular gaps located in a tube of the tubular reactor.

6. A process according to claim 5, wherein prior to commencement of the reaction, the tubular reactor is flooded with reactant-free liquid medium.

7. A process according to claim 5, wherein the flow of the solutions of the reactants and of the product suspension through the tubular reactor is laminar.

8. A process according to claim 5, wherein the length of the reactor is such that the precipitation reaction is concluded at the latest at the end of the reactor.

* * * * *

UNITED STATES PATENT AND TRADEMARK OFFICE
CERTIFICATE OF CORRECTION

PATENT NO. : 6,048,906
DATED : April 11, 2000
INVENTOR(S) : JÜRGEN ERNST ET AL

It is certified that error appears in the above-indentified patent and that said Letters Patent is hereby corrected as shown below:

On the title page, Item [73]

"Assignee: AGFA Gevaert N.V., Germany" should read

-- Assginee: AGFA Gevaert N.V., Belgium --.

Signed and Sealed this

Sixth Day of March, 2001

Attest:

NICHOLAS P. GODICI

Attesting Officer     Acting Director of the United States Patent and Trademark Office